United States Patent Office 3,713,871
Patented Jan. 30, 1973

3,713,871
COATED GLASS FIBER STRANDS
Alfred Marzocchi, Cumberland, R.I., assignor to Owens-Corning Fiberglas Corporation
No Drawing. Continuation of application Ser. No. 816,151, Apr. 1, 1969, which is a continuation of application Ser. No. 544,104, Apr. 21, 1966, both now abandoned. This application Nov. 30, 1970, Ser. No. 93,906
Int. Cl. C03c 25/02
U.S. Cl. 117—72
10 Claims

ABSTRACT OF THE DISCLOSURE

Glass fiber strand carrying a plurality of continuous coatings, at least one adjacent a strand containing a hardened material, and at least the outer coating being a base organosol or a base plastisol and method for producing such coated strand.

REFERENCE TO RELATED APPLICATION

This is a continuation of application Ser. No. 816,151, now abandoned, which in turn was a continuation of Ser. No. 544,104, filed Apr. 21, 1966, now abandoned.

This invention relates to novel multi-coated glass fiber strands, to the improved materials which may be made therefrom, and to methods for preparing same. In particular, the invention is directed to the provision of multi-coated glass fiber strands useful in the preparation of screening material.

Heretofore, insect screening has principally been manufactured from wires formed from such materials as the ferrous metals, copper and aluminum. Such materials are, however, subject to atmospheric deterioration such as by corrosion and oxidation and must be replaced more or less frequently. Moreover, screening made from such materials is subject to "sagging" from direct and repeated pressure thereon and, in addition, frequently becomes unsightly due to the staining of the screening itself and of adjacent areas due to corrosion.

More recently insect screening composed of resinous polymeric materials has been introduced which overcomes many of the disadvantages of metallic screening materials. The resinous materials are, for example, not subject to corrosion, but may often be subject to greater deformation or "sagging" than the metallics.

An ideal material for the fabrication of insect screening is glass fiber strands, such strands being highly inert, of good tensile strength and relatively light in weight. Glass fiber strands alone, however, are subject to abrasive destruction and are not easily adaptable for handling in conventional machinery designed to process other filamentary materials.

Recently it has been found that glass fiber strands may be coated with resinous materials such as polymers and copolymers of vinyl chloride and that such coated strands are characteristically highly inert and of satisfactory strength for the purpose intended. However, even such coated strands are subject to disadvantages such as flattening which may eventually lead to mechanical breakdown of the screening fabricated therefrom.

It has now been found that the advantages attained by the use of coated glass fiber strands may be retained and the disadvantages formerly associated therewith may be overcome by providing the glass fiber strands with a plurality of continuous resinous coatings differing from one another as subsequently explained in more detail.

Accordingly, the objectives of this invention are:

(1) The provision of glass fiber strands coated with a plurality of different resinous coatings, and which are highly inert, display good strength and are relatively resistant to mechanical deformation such as would cause sagging and flattening yet which are adaptable to manipulation in conventional filament processing machinery;

(2) The provision of methods for applying a plurality of resinous coatings to glass fiber strands; and (3) The provision of screening material composed of interwoven glass fiber strands which carry a plurality of resinous coatings.

The objectives of this invention are accomplished by the application to a glass fiber strand of a plurality of continuous resinous coatings, at least one of the coatings, i.e. that coating which is adjacent the strand, being convertible to a stiffened condition and hence capable of stiffening the coated fiber strand. A suitable material may be a thermosetting resin or a plasticizing component either one of which may be crosslinked and thus hardened either by heat or chemical reaction. In addition to the coating adjacent the glass fiber strand containing, e.g., the crosslinkable material, a plurality of coatings may be applied, but the exterior coating comprises a conventional thermoplastic resin having a temperature of fusion lower than the decomposition temperature of the stiffened coating. Thus, the inner hardened coat forms a stiffened protective sheath for the fiber strand, imparting added strength thereto and substantially eliminating flattening of the strand when subjected to temporary mechanical deformation such as may be imposed thereupon by a unidirectional compressive force. The exterior coating is of such a nature as to permit fusion of interwoven coated strands at points of contact when heat is applied so that sagging is substantially eliminated.

In general, applicable coating resins are those which are based on dispersions of polymers and copolymers in a suitable liquid plasticizer therefor, together with other modifying materials such as fillers, pigments, stabilizers and other similar materials, and, perhaps, solvents.

As stated previously, the coating adjecent the glass fiber strand is composed of a continuous resinous coating which contains either a thermosetting resin or a suitable plasticizer component which is capable of crosslinking by heat and/or by chemical reaction. The curing of the incorporated thermosetting resin or crosslinkable plasticizer component does not, of course, affect the dispersed base resin which hardens in accordance with the known phenomena of gelation and fusion characteristic of the base resin. The curing of the incorporated crosslinkable material adds additional strength and hardness.

Any compatible thermosetting resin is suitable for incorporation into the dispersed base resin, but the thermosetting resin is preferably one which crosslinks by addition polymerization i.e. polymerization whereby no volatile by-product is concommitantly produced.

Although the general concept of this invention embraces any thermoplastic dispersible base polymer or copolymer in a suitable plasticizer, the following description will, in the interest of brevity and clarity, be primarily directed to vinyl plastisols.

Virtually any thermosetting resin is suitable for incorporation into the plastisol coatings of the invention as long as it is compatible with the plastisol formulation and does not substantially alter properties necessary for use in conventional coating apparatus. Typical thermosetting resins which are suitable are phenoplasts such as phenol-formaldehyde condensates, melamine-formaldehyde condensates and other resins such as the furanes, epoxides and combinations of epoxide intermediates with phenoplasts, aminoplasts and isocyanates. Thermoformable urethanes may be used such as prepolymers formed from a 3 to 1 ratio of either tolylene diisocyanate or diphenylmethane- 4,4'-diisocyanate and an hydroxyl-rich branched polyester such as castor oil. Additionally other applicable thermosetting resins include among others, polyesters which crosslink by a free radical mechanism induced thermally or by means of an initiator, usually an organic peroxide; and also certain resins such as polyethylene which may be crosslinked by means of irradiation by an electron beam, gamma rays or X-rays. Of the above-disclosed resins, the epoxides are preferred. Typical epoxy resins suitable for use in the invention include, among others, the materials prepared by the reaction of epichlorohydrin with hydroxyl-containing compounds such as bisphenols, glycerol, 1,3,5-trihydroxy benzene resorcinol, 1,5-dihydroxy naphthalene and alkylene and polyalkylene glycols such as the ethylene and diethylene glycols.

Any crosslinkable plasticizing component adaptable to plastisol formulation may be added to the base plastisol for hardening the inner coating which is compatible with the base plastisol and which does not substantially alter properties necessary for use in conventional coating apparatus. For example, suitable crosslinkable plasticizers are epoxidized octyl phthalate, epoxidized soy bean oil, and other epoxy plasticizers, isocyanates and polyesters. The epoxy plasticizers are preferred, but other plasticizers containing crosslinkable functional groups are known in the art and the use of any specific plasticizer is not the crux of this invention.

The suitable thermoplastic resins most commonly used as the dispersed base polymers and copolymers in plastisols and which may be used herein include polymers and copolymers of vinyl chloride with other vinyl monomers such as vinyl acetate, vinylidene chloride, acrylates, methacrylates, vinyl ethers and other copolymerizable monomers. As with the thermosetting resins disclosed above, it is to be understood that any thermoplastic polymer adaptable to plastisol and organosol formulation is considered within the scope of the invention.

Plasticizers which may be incorporated with the above thermoplastic resins are known in the art and may be determined by consulting any standard reference material such as Polymer Processes by C. E. Schildknecht. Among the more common plasticizers the isocyanates, the phthalate esters such as dioctyl phthalate, butyl decyl phthalate, isodecyl phthalate, didecyl phthalate, di-n-butyl phthalate, di-2-ethylhexyl phthalate, butyl benzyl phthalate, butyl cyclohexyl phthalate, isophthalate esters such as 2-ethylhexyl isophthalate, hexahydrophthalates, hexahydroisophthalates and terephthalates, adipate esters such as dioctyl adipate and isononyl adipate, azelate and sebacate esters such as dioctyl sebacate and butyl sebacate, phosphate esters such as tricresyl phosphate, trioctyl phosphate and tri-n-butyl phosphate, polyesters and chlorinated paraffins, acid esters such as butyl stearate and octyl palmitate, citrate esters such as acetyl tributyl citrate, glycol esters such as polyethylene glycol di-2-ethylhexoate and epoxidized materials including epoxy glycerides such as epoxidized soya bean oil, epoxy fatty acid esters such as butyl epoxystearate, di - 2 - ethylhexylepoxy tetrahydrophthalate, n-hexyl epoxystearate, isoctyl epoxystearate and octyl epoxystearate, epoxidized peanut oil, the epoxidized diacetoglyceride from fats, diglycidyl ethers, glycidyl oleate and many others. The epoxy plasticizers are preferred because of their combination of plasticization and stabilization properties and their ability to cure by treatment with suitable curing or crosslinking agents. In fact, stiffening of the strand coating adjacent the glass fiber strand is preferably accomplished by a crosslinkable plasticizer, such as the epoxy plasticizers set forth supra, incorporated in the base plastisol.

Curing agents for the disclosed thermosetting resins include the typical metal oxides such as calcium and magnesium oxides for the phenoplasts; and benzoic acid, chloroacetamide and triethanolamine hydrochloride for the aminoplasts; organic peroxides such as benzoyl peroxide commonly used with an inhibitor, hydroquinine for the polyesters. Epoxide accelerators include the amines such as ethylene diamine, diethylene triamine, m-phenylene diamine, methylamine and hexamethylene diamine, acids and anhydrides such as phosphoric acid and succinic acid anhydride, amides such as urea, adipamide, thiourea and p-toluenesulfonamide and other materials such as liquid polysulfide polymers, phenolics, polyamides and urea resins.

In addition to the resins, plasticizers and accelerators set forth above, the plastisols of the invention may also include modifying agents such as stabilizers, for example of the metallic soap type, coloring agents, fillers and, in the case of organosols, diluents.

APPLICATION OF RESIN COATINGS TO GLASS FIBER STRANDS

In describing the methods of the invention by which glass fiber strands are coated, it should be noted initially that the plastisol must have satisfactory flow properties for the intended application method and it should exhibit the desired end properties after fusion. Therefore, the specific plastisol formulation will differ as to ingredients and viscosity, depending on the method of coating to be used and the intended use for the coated strand.

Generally, the glass fiber strands are guided from spools or mandrels to a coating machine wherein each of the strands is coated with the desired plastisol composition and then to a curing oven after each coating and finally to storage or to fabrication apparatus. Conventional coating methods may be used such as the rotating die coating method wherein the coating apparatus includes one or more reservoirs containing plastisol through which the glass fiber strands are initially guided. The coated strands are then acted upon by wipers and dies of varying sizes which eliminate excess coating material and regulate the thickness and configuration of the coating. Under most circumstances a coating from about .0005 inch to about .020 inch in thickness and circular or oval in cross section is preferred. Since the actual manipulative steps of applying the coatings to the strands are not a part of this invention, reference is herein made to U.S. Pat. 2,867,891 to R. C. Horton et al. which discloses suitable apparatus for coating glass fiber strands.

In its essential details the method of the invention involves applying a plurality of continuous plastisol coatings to glass fiber strands. The first plastisol coating adjacent the glass fiber strand contains a quantity of thermosetting resin or crosslinkable plasticizer component which when cured imparts a stiffened quality to the coating. An amine cure accelerator for an epoxy plasticizer can be applied directly to the fiber strands prior to coating with a plastisol containing an epoxy plasticizer; or on the other hand, the amine cure accelerator may be added to the plastisol for the coating adjacent the glass fiber strand and the epoxy plasticizer added to the plastisol for the second coating contiguous with the first.

Alternately, appropriate parts of a plastisol containing an amine cure accelerator for an epoxy plasticizer and a plastisol containing an epoxy plasticizer may be mixed together and allowed to stand under ambient conditions for a time sufficient to allow partial cure to occur; and before cure is complete, coating the glass fiber strands.

Complete cure takes place in all cases upon application of heat to the coated fiber strand, e.g., by passage through a curing oven. A conventional plastisol which is heat fused by passage through a curing oven and then hardened by cooling is used for the outer coating. The completed strands are then wound on spools or mandrels and stored or are interwoven on conventional machinery into insect screen or the like. The screening is then finished by heating to cause fusion at points of contact between the coated fiber strands.

High shear conditions prevail during the application of the plastisol coatings to the glass fiber strands. Strand speeds of 700 feet per minute are frequently used. For this reason it is important that the plastisol coatings have suitable viscosity characteristics since, if too viscous, the strand will pull through the plastisol reservoir or die uncoated and, if insufficiently viscous, the plastisol will drip or "spit" from the strand, producing an uncoated or unevenly coated surface.

The following examples are presented to clearly illustrate preferred embodiments of the invention and are not intended to be construed as a limitation of the scope thereof.

Example 1

A first base plastisol containing an epoxidized plasticizer was first prepared from the following ingredients:

| Material: | Grams |
|---|---|
| Polyvinyl chloride | 1200 |
| Phthalate plasticizer | 72 |
| Tri (2-ethylhexyl) phosphate plasticizer | 126 |
| Aluminum pigment | 12 |
| Di-n-octyldecyl adipate plasticizer | 126 |
| $Sb_2O_3$ flame retarder | 48 |
| Ba/Cd stabilizer | 24 |
| Ba/Zn stabilizer | 12 |
| Epoxidized polyethylene glycol | 266 |

The polyvinyl chloride was charged into a suitable vessel equipped with a simple planetary mixer. The liquid ingredients were premixed in another container. A part of the premixed liquid ingredients was prepasted with the $Sb_2O_3$ and the aluminum pigment and then added to the vessel containing the polyvinyl chloride. About 80 percent of the premixed liquid ingredients were added and mixed together for about five minutes. The remaining liquid ingredients were then added and allowed to mix for about 2 hours.

A second base plastisol was prepared in the same manner as the first from the ingredients listed below:

| Material: | Grams |
|---|---|
| Polyvinyl chloride | 1200 |
| Phthalate plasticizer | 72 |
| Tri (2-ethylhexyl) phosphate plasticizer | 126 |
| Aluminum pigment | 12 |
| Di-n-octyldecyl adipate plasticizer | 126 |
| $Sb_2O_3$ flame retarder | 48 |
| Ba/Cd stabilizer | 24 |
| Ba/Zn stabilizer | 12 |

Glass fiber strands were passed through a solution comprising 84.0 g. diamine propyl diethylene triamine, were then coated with the first base plastisol, and were then coated with the second base plastisol. The rotating die coating method was used to apply both plastisol coatings. The strand speed through the dies was 650 feet per minute and the strands were heated in a curing oven at a temperature of 450° F. after each coating. The finished strands exhibited increased toughness and resistance to oxidation and mechanical deformation. When interwoven into insect screening and heat treated, the strands fused at their points of contact.

Example 2

A plastisol was prepared following the same procedure outlined in Example 1 from the ingredients listed below:

| Material: | Grams |
|---|---|
| Polyvinyl chloride | 1200 |
| Phthalate plasticizer | 72 |
| Tri (2-ethylhexyl) phosphate plasticizer | 128 |
| Epoxidized tall oil | 268 |
| Aluminum pigment | 12 |
| Di-n-octyldecyl adipate plasticizer | 132 |
| $Sb_2O_3$ | 48 |
| Ba-Cd stabilizer | 24 |
| Ba-Zn stabilizer | 12 |
| Diamine propyl diethylene triamine | 84 |

Glass fiber strands were then coated in the manner described in Example 1, first with the above described plastisol, then with the first base plastisol of Example 1 and lastly with the second base plastisol of Example 1. After each coating the strands were passed through a curing oven at 450° F. The finished strands carrying the multiple coatings exhibited increased strength, resistance to oxidation and mechanical deformation and when interwoven were amenable to softening and fusion at the points of contact during heat treatment.

Example 3

A plastisol containing both an amine accelerator and an epoxidized plasticizer was prepared by mixing together in a suitable vessel equal portions of the first base plastisol of Example 1 which contained the epoxidized plasticizer and a plastisol prepared according to the procedure outlined in Example 1 from the ingredients listed below and containing an amine accelerator.

| Material: | Grams |
|---|---|
| Polyvinyl chloride | 2400 |
| Phthalate plasticizer | 130 |
| Tri(2-ethylhexyl) phosphate plasticizer | 256 |
| Polyethylene glycol plasticizer | 533 |
| Aluminum pigment | 24 |
| Di-n-octyldecyl adipate plasticizer | 204 |
| $Sb_2O_3$ flame retarder | 96 |
| Ba/Cd stabilizer | 48 |
| Ba/Zn stabilizer | 24 |
| M-phenylene diamine accelerator | 164 |

The resulting plastisol mix was allowed to cure partially. Glass fiber strands were then coated in the manner described in Example 1 with the partially cured plastisol mix and then with the second base plastisol of Example 1. After each coating the strands were heat cured at a temperature of 450° F. by passage through a curing oven. The finished strands exhibited increased strength, resistance to oxidation and mechanical deformation; and when interwoven were fused at their points of contact upon suitable application of heat.

Obviously, thermosetting and crosslinkable plasticizers other than those illustrated in the specific plastisol compositions set forth above may be used with comparable results, as can thermosetting resins, preferably such resins which are convertible to a thermoset condition by addition polymerization.

It is to be understood that further variations may be made in the specific formulations and methods of application described above without departing from the spirit and scope of the invention.

I claim:

1. A method of preparing a multicoated glass fiber strand which comprises (a) treating the strand with a curing agent, (b) preparing a first coating composition consisting essentially of a base vinyl plastisol and a material hardenable by said curing agent, (c) controlling the plasticizer content to provide a coating composition viscosity at which the composition is applicable to a glass fiber strand by a die-coating method, (d) applying a continuous coating of said first composition to the treated strand by die-coating, (e) heat treating the coated strand to fuse the plastisol and to harden the material, (f) preparing a second coating composition consisting essentially of a base vinyl plastisol, (g) controlling the plasticizer content to provide a coating composition viscosity at which the composition is applicable to a glass fiber strand by a die-coating method, (h) applying a continuous coating of said second composition to the heat treated coated strand and (i) heat treating the coated strand to fuse the second plastisol coating.

2. The method of claim 1 wherein said hardenable material is selected from the group consisting of thermosetting resins and crosslinkable plasticizers.

3. The method of claim 1 wherein said hardenable material is an epoxy plasticizer.

4. A method of preparing a multi-coated glass fiber strand which comprises (a) preparing a first coating composition consisting essentially of a base vinyl plastisol and a curing agent, (b) controlling the plasticizer content to provide a coating composition viscosity at which the composition is applicable to a glass fiber strand by a die-coating method, (c) applying a continuous coating of said first composition to the glass fiber strand by a die-coating method, (d) preparing an intermediate coating composition consisting essentially of a base vinyl plastisol and a material hardenable by the curing agent, (e) applying a continuous coating of said intermediate composition to said first continuous coating by a die-coating method, (f) heat treating the coated strand to fuse the plastisol and to harden said material, (g) preparing a third coating composition consisting essentially of a base vinyl plastisol, (h) controlling the plasticizer content to provide a coating composition viscosity at which the composition is applicable to a glass fiber strand by a die-coating method, (i) applying an outer continuous coating of said third composition to the coated strand by a die-coating method and (j) heat treating the coated strand to fuse the third plastisol coating.

5. The method of claim 4 wherein said hardenable material is an epoxy plasticizer.

6. The method of claim 5 wherein said vinyl plastisol is selected from the group consisting of plastisols of the polymers and copolymers of vinyl chloride.

7. A method of preparing a multi-coated glass fiber strand which comprises (a) preparing a first mixture consisting essentially of a base vinyl plastisol and a curing agent, (b) preparing a second mixture consisting essentially of a base vinyl plastisol and a material hardenable by the curing agent, (c) combining said first and second mixtures and controlling the plasticizer content to provide a mixture viscosity at which the mixture is applicable to a glass fiber strand by a die-coating method, (d) allowing partial reaction to occur between said curing agent and said hardenable material, (e) applying said partially reacted mixture to a glass fiber strand as a continuous hardenable coating by a die-coating method, (f) heat treating the coated strand to fuse the plastisol and to harden the material, (g) preparing a second coating composition consisting essentially of a base vinyl plastisol, (h) controlling the plasticizer content to provide a coating composition viscosity at which the composition is applicable to a glass fiber strand by a die-coating method, (i) applying a continuous outer coating of said second composition to the heat-treated coated strand by a die-coating method and (j) heat treating the coated strand to fuse the second plastisol coating.

8. The method of claim 7 wherein said hardenable material is selected from thermosetting resins and crosslinkable plasticizers.

9. The method of claim 8 wherein said vinyl plastisol is selected from plastisols of polymers and copolymers of vinyl chloride.

10. The method of claim 8 wherein said hardenable material is an epoxy plasticizer.

References Cited

UNITED STATES PATENTS

| | | | |
|---|---|---|---|
| 2,431,745 | 12/1947 | Flanagan | 117—76 T |
| 2,428,716 | 10/1947 | McGill et al. | 117—76 T |
| 2,892,808 | 6/1959 | Shafer | 117—126 GB |
| 3,020,173 | 2/1962 | Stieffenhofer | 117—76 T |
| 2,787,314 | 4/1957 | Anderson | 117—124 |
| 2,842,459 | 7/1958 | Gollub et al. | 117—126 |
| 2,867,891 | 1/1959 | Horton | 117—126 X |
| 2,939,761 | 6/1960 | Stein | 117—124 X |
| 3,067,059 | 12/1962 | Jannarelli et al. | 117—126 X |
| 3,245,925 | 4/1966 | Watson | 117—126 X |
| 3,298,854 | 1/1067 | Marzocchi | 117—126 X |
| 3,369,957 | 2/1968 | Caroselli et al. | 117—126 |

WILLIAM D. MARTIN, Primary Examiner

D. COHEN, Assistant Examiner

U.S. Cl. X.R.

117—76 T, 126 GB